US008976705B2

(12) United States Patent
Shaffer et al.

(10) Patent No.: US 8,976,705 B2
(45) Date of Patent: Mar. 10, 2015

(54) SYSTEM AND METHOD FOR PROVIDING CONFIGURATION DATA IN A MESH NETWORK

(75) Inventors: Shmuel Shaffer, Palo Alto, CA (US);
Charles I. Okwudiafor, Fremont, CA (US); Sandeep J. Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 12/968,163

(22) Filed: Dec. 14, 2010

(65) Prior Publication Data

US 2012/0147783 A1 Jun. 14, 2012

(51) Int. Cl.
*H04L 12/28* (2006.01)
*H04W 4/00* (2009.01)
*H04W 4/08* (2009.01)
*H04W 4/02* (2009.01)

(52) U.S. Cl.
CPC .............. *H04W 4/08* (2013.01); *H04W 4/001* (2013.01); *H04W 4/023* (2013.01)
USPC ......................................... 370/254; 370/329

(58) Field of Classification Search
USPC ................... 370/254–256; 709/220–222, 252
See application file for complete search history.

(56) References Cited

U.S. PATENT DOCUMENTS

| 5,224,099 | A | 6/1993 | Corbalis et al. |
| 5,311,418 | A | 5/1994 | Lalander |
| 5,390,068 | A | 2/1995 | Schultz et al. |
| 6,212,164 | B1 | 4/2001 | Murakami et al. |
| 6,501,628 | B1 | 12/2002 | Namba et al. |
| 6,859,435 | B1 | 2/2005 | Lee et al. |
| 6,906,434 | B1 | 6/2005 | Koeppe et al. |
| 7,013,347 | B1 | 3/2006 | Moen |
| 7,508,173 | B2 | 3/2009 | Zhou et al. |
| 7,564,789 | B2 | 7/2009 | Betker |
| 7,953,088 | B2 | 5/2011 | Cheriton et al. |
| 7,965,681 | B2 * | 6/2011 | Berglund et al. ............. 370/329 |
| 2002/0087234 | A1 | 7/2002 | Lof et al. |
| 2002/0105231 | A1 | 8/2002 | Koeppe et al. |
| 2004/0167677 | A1 | 8/2004 | Weiss |
| 2005/0174942 | A1 | 8/2005 | Betker |
| 2006/0045011 | A1 | 3/2006 | Aghvami et al. |
| 2007/0002740 | A1 | 1/2007 | Evans et al. |
| 2007/0201365 | A1 | 8/2007 | Skoog et al. |
| 2008/0085702 | A1 | 4/2008 | Park et al. |
| 2008/0177678 | A1 | 7/2008 | DiMartini et al. |
| 2010/0205281 | A1 * | 8/2010 | Porter et al. ................... 709/220 |
| 2010/0317317 | A1 * | 12/2010 | Maier et al. ................. 455/404.2 |

OTHER PUBLICATIONS

USPTO Jan. 23, 2012 Non-Final Office Action from U.S. Appl. No. 12/710,284.

(Continued)

*Primary Examiner* — Afshawn Towfighi
(74) *Attorney, Agent, or Firm* — Patent Capital Group

(57) ABSTRACT

A method is provided in one example embodiment and includes receiving packets from a group of nodes configured to operate in a mesh network; referencing geographic information associated with the group of nodes; evaluating a subset of the group of nodes within a particular geographic area; determining a global positioning system (GPS) location and a relative location associated with the subset of the group of nodes; determining configuration data for the subset of the group of the nodes; and communicating the configuration data to the subset of the group of nodes.

20 Claims, 4 Drawing Sheets

(56) References Cited

OTHER PUBLICATIONS

USPTO Apr. 23, 2012 Response to Jan. 23, 2012 Non-Final Office Action from U.S. Appl. No. 12/710,284.
USPTO Jun. 21, 2012 Final Office Action from U.S. Appl. No. 12/710,284.
USPTO Sep. 18, 2012 RCE Response to Jun. 21, 2012 Final Office Action from U.S. Appl. No. 12/710,284.
U.S. Appl. No. 12/710,284, filed Feb. 22, 2010, entitled "System and Method for Providing Collaborating Power Controllers," Inventor: Shmuel Shaffer.
U.S. Appl. No. 12/968,123, filed Dec. 14, 2010, entitled "System and Method for Optimizing Packet Routing in a Mesh Network," Inventors: Shmuel Shaffer, et al.
Wikipedia, the free encyclopedia, "AC Power," 4 pages; printed from http://en.wikipedia.org/wiki/AC_power#Real.2C_reactive.2C_and_apparent_power on Feb. 22, 2010.
Cisco, "Bringing the SmartGrid into the Home: The Value of Home Energy Management for Utilities," Whitepaper, © 2010, 6 pages.
Digital Phase Converters—Phase Converter Information; 2 pages; printed from http://www.phaseconverterinfo.com/phaseconverter_digital.htm on Feb. 22, 2010.
Nokian Capacitors, Ltd., "DW-series detuned filter capacitor bank," 2 pages; EN-LV14—May 2007; www.areva-td.com.
American Superconductor, "Dynamic Reactive Power Compensation," 2 pages; © 2004; printed from http://www.amsc.com/documents/PES_SVR_01_0804a.pdf on Feb. 22, 2010.
J. Sangiamwong and T. Sugiyama, "Hidden Node Problem Aware Routing Metric for Wireless LAN Mesh Networks," 18$^{th}$ Annual IEEE International Symposium on Personal, Indoor and Mobile Radio Communications (PIMRC'07), © 2007 IEEE, 5 pages.
Meshdynamics, Inc., "Meshdynamics Network Viewer User Guide," Network Viewer Release 9.0, © 2008, 57 pages; www.meshdynamics.com.
Wikipedia, the free encyclopedia, "Power Factor," 9 pages; printed from http://en.wikipedia.org/wiki/Power_factor on Feb. 22, 2010.
S&C Electric Company, "What is VAR Management?" 2 pages; Apr. 15, 2002; printed from http://www.sandc.com/webzine/2002/041502_1.asp on Feb. 22, 2010.
USPTO Mar. 29, 2013 Non-Final Office Action from U.S. Appl. No. 12/710,284.
USPTO Jun. 28, 2013 Response to Mar. 29, 2013 Non-Final Office Action from U.S. Appl. No. 12/710,284.
USPTO May 2, 2013 Non-Final Office Action from U.S. Appl. No. 12/968,123.
USPTO Aug. 2, 2013 Response to May 2, 2013 Non-Final Office Action from U.S. Appl. No. 12/968,123.
USPTO Sep. 20, 2013 Notice of Allowance from U.S. Appl. No. 12/968,123.
USPTO Dec. 9, 2013 Final Office Action from U.S. Appl. No. 12/710,284.
USPTO Apr. 24, 2014 Non-Final Office Action from U.S. Appl. No. 12/710,284.
USPTO Sep. 26, 2014 Notice of Allowance from U.S. Appl. No. 12/710,284.

\* cited by examiner

SYSTEM AND METHOD FOR PROVIDING CONFIGURATION DATA IN A MESH NETWORK

TECHNICAL FIELD

This disclosure relates in general to the field of packet management and, more particularly, to providing configuration data in a mesh network.

BACKGROUND

Mesh networks have gained notoriety because they are easy to use and because they can be quickly provisioned. Typically, a mesh network includes multiple types of devices that can relay information to each other and/or relay information toward a given destination. A wireless mesh network can provide a high-bandwidth network over a specific coverage area, while incurring minimal infrastructure costs. In many cases, the wireless mesh architecture mirrors a router network configuration, minus the cumbersome cabling between nodes. This is because peer radio devices in the mesh network do not have to be cabled or hardwired in the same way in which access points are provisioned. The ability to properly manage and coordinate packet routing in a mesh network provides a significant challenge to network operators, component manufacturers, service providers, and system administrators alike.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving packets from a group of nodes configured to operate in a mesh network; referencing geographic information associated with the group of nodes; evaluating a subset of the group of nodes within a particular geographic area; determining a global positioning system (GPS) location and a relative location associated with the subset of the group of nodes; determining configuration data for the subset of the group of the nodes; and communicating the configuration data to the subset of the group of nodes.

In more specific implementations, the method can include determining an identifier associated with the packets, and evaluating the identifier in order to correlate the identifier to at least one node of the group of nodes. Additionally, determining the configuration data for the subset of the group of the nodes can further include determining hidden nodes within the subset of the group of nodes based on the relative location of the subset of the group of nodes; assigning a selected one of a transmission power parameter and an orthogonal frequency hopping sequence parameter to the subset of the group of nodes having the hidden nodes; and communicating the parameters to the subset of the nodes.

In other implementations, the evaluating the group of nodes within the particular geographic area further includes obtaining a respective network address for each one of the group of nodes; determining a street address associated with a particular packet sent from a meter element; and mapping the street address to a selected portion of the geographical GPS information. The configuration data can include channel allocation for the subset of the group of nodes, or a hopping schema for packets that traverse the mesh network and the subset of the group of nodes. The geographic information can be retrieved from a global positioning system (GPS) map or from a geographic information system (GIS) element.

Example Embodiments

Figure 1:
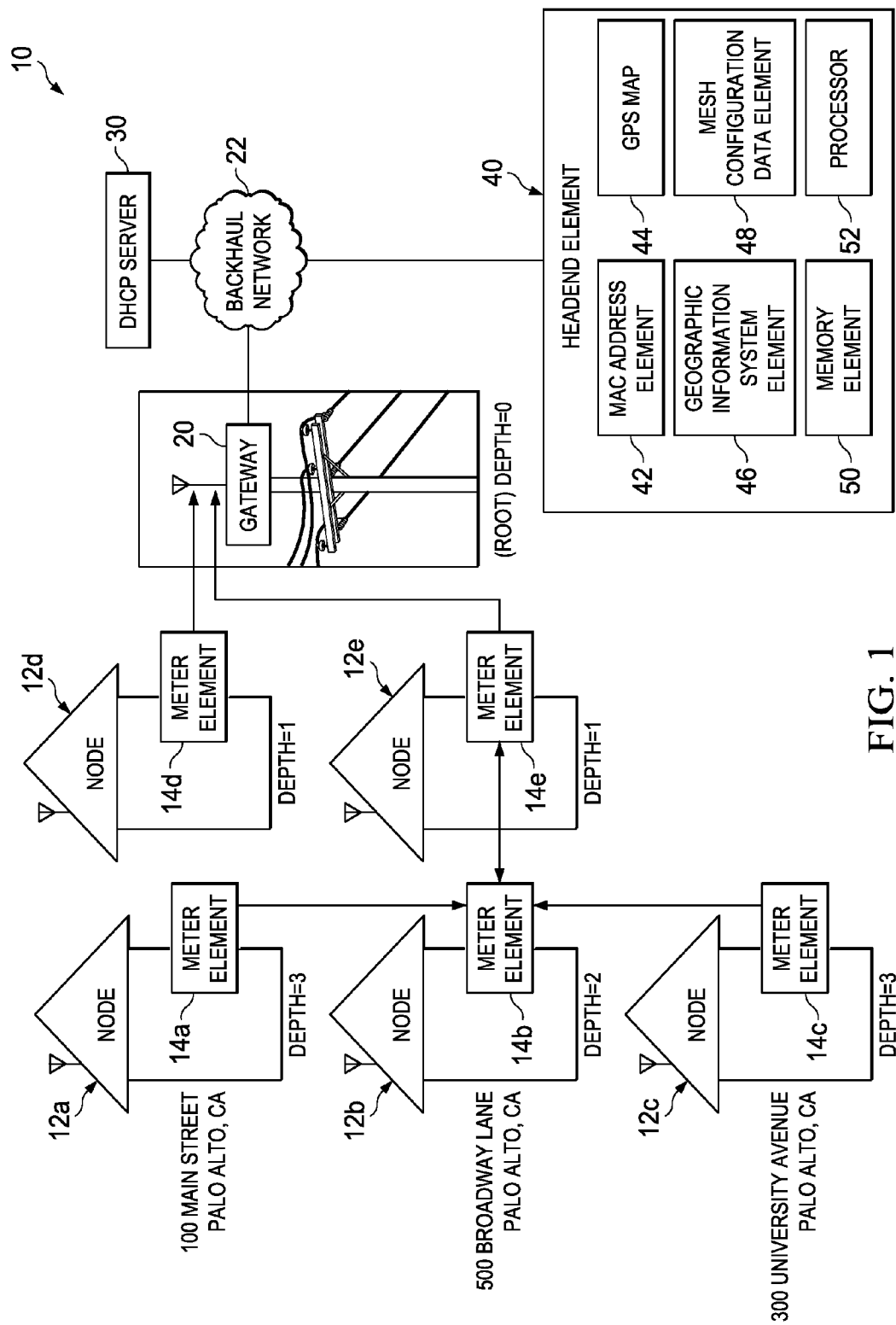
FIG. 1 is a simplified block diagram of a communication system for optimizing packet routing in a mesh network in accordance with one example embodiment of the present disclosure.

Turning to FIG. 1, FIG. 1 is a simplified block diagram of a communication system 10 for optimizing packet routing in a mesh network. FIG. 1 includes multiple nodes 12a-e that are representative of residential customers in a neighborhood environment. Each node 12a-e includes a respective meter element 14a-e that is configured to track power consumption for that particular customer. In this particular example, a number of different addresses are provided for several of the nodes, where each of nodes 12a-e is illustrated as having a respective depth with respect to the root node, which is detailed below. The particular architecture of FIG. 1 can be associated with a wireless local area network (WLAN) configuration, or alternatively it can represent any other type of network configuration associated with a mesh topology such as power line communication (PLC), etc.

FIG. 1 also includes a gateway 20, which is configured to serve as the root to different hosts that are represented as nodes 12a-e. Collectively, the hosts in this particular example are indicative of self-forming mesh networks. Each of nodes 12a-e are configured to communicate data to each other, and to communicate data to the root. Additionally, each of nodes 12a-e have intelligence to advertise a number of hops necessary to reach the root (i.e., gateway 20 in this example implementation). In this particular instance, nodes 12d-e having a depth of one (1) can readily connect with gateway 20, which serves as their root. Hence, nodes 12d-e are one hop away from their root.

Gateway 20 is coupled to a backhaul network 22 that can be accessed by a dynamic host configuration protocol (DHCP) server 30, which can provision (or otherwise manage) network addresses for nodes 12a-e. Additionally, backhaul network 22 provides a pathway for a headend element 40, which may be associated with a supervisory control and data acquisition (SCADA) infrastructure. Headend element 40 may further include a media access control (MAC) address element 42, a mesh configuration data element 48, a memory element 50, and a processor 52. Headend element 40 can be thought of as a network operating center for the mesh architecture: capable of providing network management functions. Headend element 40 may further include a global positioning system (GPS) map 44 and a geographic information system (GIS) element 46.

Semantically, communication system 10 can include multiple residential, commercial, or industrial consumers: each of which include a respective meter element 14a-e. Each meter element 14a-e can be configured to track power consumption from any suitable source. For example, each meter element 14a-e may interface with an electric grid, where the source of power can include conventional energy sources (e.g., nuclear, coal, gas, etc.), renewable energy sources (e.g., windmills, solar panels, geothermal mechanisms, biofuels, hydroelectricity, etc.), or any other suitable energy supply. The electric grid may include power generation mechanisms, transmission lines, transmission substations, distribution lines, distribution substations, etc. that can coordinate/manage power generation and power distribution for consumers shown in communication system 10.

Certain elements of FIG. 1 may couple to one another through suitable interfaces (wired or wireless), transmission lines, or through any other appropriate connection that provides a viable pathway for packet communications. Additionally, any one or more of the elements of FIG. 1 may be combined or removed from the architecture based on particular mesh configuration needs. Additionally, certain components of communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol or tunneling technique, where appropriate and based on particular needs. Legacy non-IP protocols over separate wires, over power lines (over wireless components, etc.) may be similarly utilized.

For purposes of illustrating certain example techniques of communication system 10, it is important to understand the problematic areas that are prominent in mesh networks. The following foundational information may be viewed as a basis from which the present disclosure may be properly explained. Typically, a wireless mesh network is a communications network made up of radio or PLC nodes organized in a mesh topology. Wireless mesh networks often consist of mesh clients, mesh routers, and gateways. The mesh clients are often laptops, cell phones, smartphones, computers, sensors, utility meters, and other wired or wireless devices, where mesh routers forward traffic to/from the gateways. The coverage area of the radio nodes (working as a single network) is sometimes called a mesh cloud. Access to the mesh cloud is dependent on the radio nodes working in harmony with each other to create a radio network. At least in theory, a mesh network is reliable and, further, offers redundancy. When one node can no longer operate, the rest of the nodes can still communicate with each other directly, or through one or more intermediate nodes.

Multi-hop wireless mesh networks are popular because of their self-healing properties and, further, because such networks are easy to install and to provision. In operation, mesh networks provide long-range connectivity by relaying packets from one mesh node to another (e.g., much like a bucket brigade protocol). The end of the bucket brigade terminates at the root, which typically connects to the Internet, to an Ethernet link, etc. Additionally, relays connect to the root (or to other relay nodes) to form a wirelessly linked chain.

Hence, the root typically has a wired uplink, where its backhaul is some type of wired network. Relays have wireless uplinks through an upstream downlink radio. Downlink radios operate as access points (e.g., systematically sending out beacons), whereas uplink radios operate as clients. From the user perspective, a wireless radio card (e.g., in a laptop computer, in a smartphone, etc.) can inform an individual of the presence of downlinks. Collectively, the uplink and downlink radios form a wireless backhaul path.

Returning to the illustration of FIG. 1, in this example, the node at 100 Main Street is not aware of the node of 300 University Avenue. However, these two nodes do share a common parent node 500 Broadway Lane. When the two unaware nodes communicate at the same frequency and on the same channel (at the same time), the node at 500 Broadway Lane experiences sub-optimal performance due to the packet collisions.

In accordance with certain embodiments of the present disclosure, these degradation issues can be ameliorated by providing enhanced configuration data to nodes 12a-e from headend element 40, gateway 20, or any other server attached to the network. Headend element 40 has the intelligence including access to information stored in a database to be aware of all the nodes in the system. Hence, headend element 40 can leverage geographic information (e.g., found in geographic information system element 46 and/or GPS map 44) in order to minimize performance issues (e.g., minimize collisions) associated with hidden neighbors. In one sense, headend element 40 is giving context for routing, channel management, frequency management, etc. for the mesh network.

To properly address the hidden node issue (i.e., which packets should be transmitted at which time, at which frequency, etc.), mesh configuration data element 48 can be used to broadcast configuration data (or at least hints associated with configuration data) to nodes for which it has responsibility. For example, a particular frequency could be designated for one node that is immediately adjacent to another node, which occupies a different frequency. Additionally, the configuration data can include intelligent channel assignments, frequency hopping schema, or any other appropriate configuration data that may help to optimize packet transmissions in the mesh network.

Part of the enhancement of the present disclosure lies in using geographic information associated with meters (being inferred from any suitable source) to evaluate the relative distance between two nodes. This information can be used to determine an optimal parameters such as power, frequency and hopping schema for the mesh network. In one general sense, headend element 40 intelligently orchestrates packet transmissions across the mesh network. Without the intelligence of communication system 10, nodes 12a-e (inclusive of gateway 20) would be oblivious to each other and, therefore, collisions would be prevalent. Headend element 40 can configure each of nodes 12a-e (including gateway 20 that is also a node) based on this enhanced geographic information to engender better network performance.

In operation, headend element 40 is configured to receive information associated with particular meter elements 14a-e. In a particular implementation, headend element 40 has geographic information associated with each particular node 12a-e. More specifically, headend element 40 can identify particular network interface cards corresponding to specific geographical coordinates. Furthermore, each of nodes 12a-e can be assigned particular geographical coordinates in relation to each other.

Note that, in particular examples, each meter element 14a-e may be part of a home energy controller (HEC), or a home/facility energy management system (e.g., that is enabled by the smart grid). Each meter element 14a-e may also be part of an extension to a smart meter device. Additionally, each meter element 14a-e may be part of a computer system (or a proprietary system) or a smart green energy system, which assists in coordinating activities related to power transmission and/or smart grid activities. In one particular paradigm, FIG. 1 is representative of residential, commercial, or industrial consumers proximate to each other such that packet propagation is possible using mesh network protocols. This can include relaying packets between meter elements 14a-e and gateway 20. As a related note, each respective meter element 14a-e (or the node itself) can be provisioned with a respective network address (e.g., a MAC address, an IP address, etc.). The network addresses may be used as a basis for billing particular consumers for network service, energy consumption, or any other suitable parameter. The network addresses can be managed or otherwise coordinated through DHCP server 30 and/or MAC address element 42.

In one particular instance, nodes 12a-e are provisioned with enhanced configuration data such that the functionalities discussed herein is achieved. Note that each respective meter element 14a-e may be equipped for such packet propagation, or infrastructure within nodes 12a-e can be used for facilitating packet propagation. Accordingly, as used herein in this Specification, the term 'node' is meant to encompass various types of infrastructure found at particular nodes. Hence, each node 12a-e and gateway 20 can be inclusive of respective meter elements 14a-e, computers, smartphones, iPads, laptops, routers, switches, gateways, bridges, loadbalancers, firewalls, servers, inline service nodes, proxies, processors, modules, sensors, utility meters, or any other suitable device, component, element, or object operable to exchange information in a network environment. Each node 12a-e and gateway 20 may include appropriate processors, memory elements, hardware and/or software to support (or otherwise execute) the activities associated with packet management in a wireless mesh network, as outlined herein. Moreover, each node 12a-e and gateway 20 may include any suitable components, modules, interfaces, or objects that facilitate the operations thereof. This may be inclusive of appropriate algorithms and communication protocols that allow for the effective exchange of data or information.

In a specific implementation, headend element 40 includes software to achieve (or to foster) the packet management operations, as outlined herein in this document. For example, this could include utilizing mesh configuration data element 48, geographic information system element 46, and/or GPS map 44 (shown in FIG. 1) to achieve these functions (which may be provided in software, hardware, or any suitable combination of these). These elements (either individually, or operating in concert) can be configured to execute any of the activities discussed herein with respect to packet management functions. Furthermore, in one example, headend element 40 can have an internal structure (e.g., have a processor, a memory element, etc.) to facilitate the operations described herein. In other embodiments, all of these packet management features may be provided externally to headend element 40 or included in some other location to achieve this intended functionality. Alternatively, any other network element can include this software (or reciprocating software) that can coordinate with nodes 12a-e in order to achieve the operations, as outlined herein.

Figure 2:
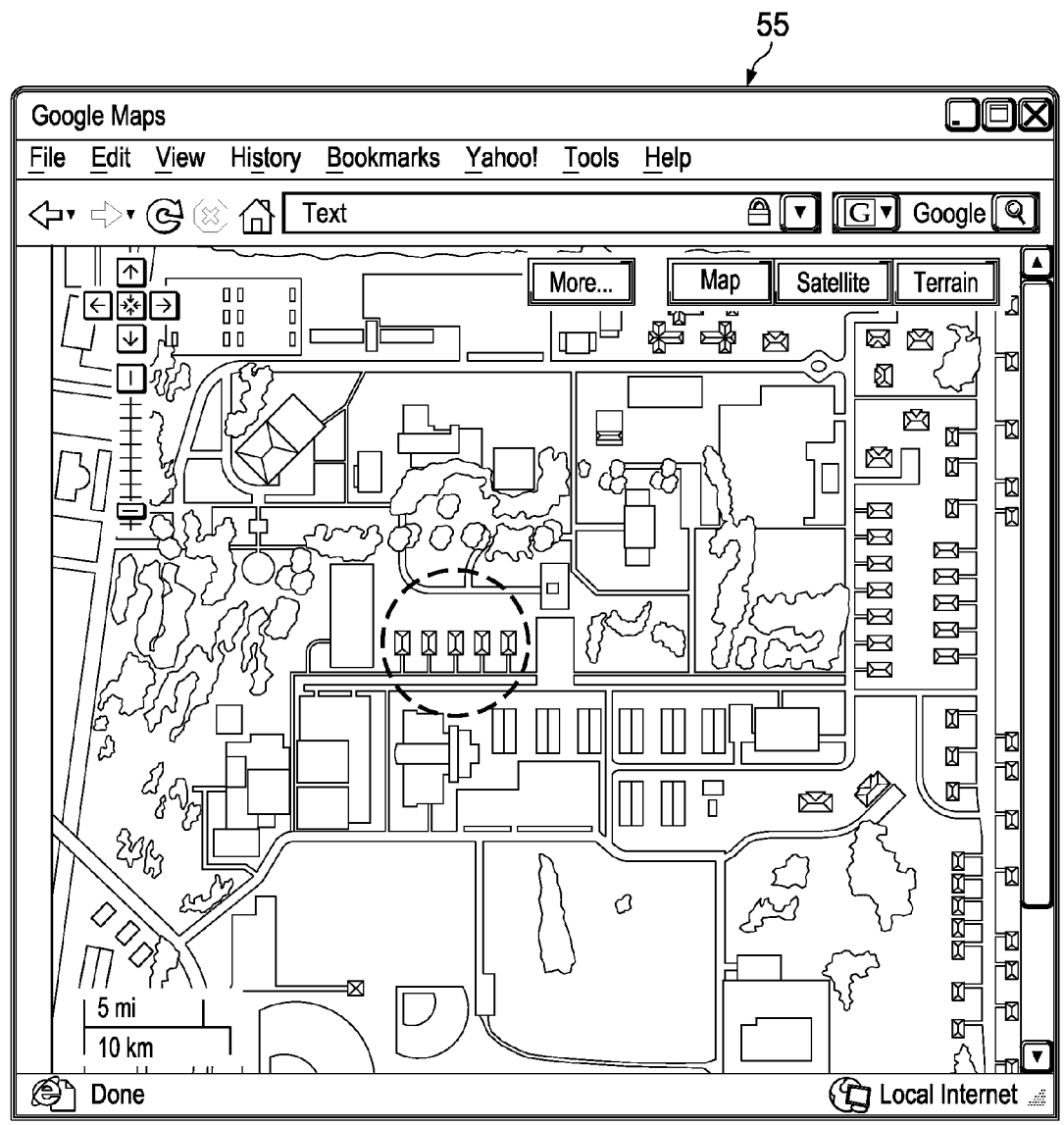
FIG. 2 is a simplified schematic diagram of an example map associated with a mesh network in accordance with one embodiment of the present disclosure.

FIG. 2 is a simplified schematic diagram illustrating a map 55 associated with one possible arrangement of nodes 12a-e and gateway 20. A group of residential nodes is being identified by this particular map 55. Note that any suitable GPS map can provide longitude and latitude coordinates to be used in the intelligent packet routing of communication system 10. For example, geographic information system element 46 can provide dimensional characteristics (e.g., buildings, natural landmasses, etc.), as well as intervening objects between nodes. Furthermore, GPS map 44 can be inclusive of any type of graphical images, video, or schematics that would offer clues about particular geographical locations. In one particular implementation, the geographic information system is a particular web server or website (e.g., similar to what is provided by Google maps). Logistically, a given neighbor list (e.g., stored in MAC address element 42) can contain MAC address of neighbor nodes, where this information can be used in conjunction with geographic data to determine which node is a hidden node.

Mesh configuration data element 48, GPS map 44, and/or geographic information system (GIS) element 46 may be provisioned within (or suitably coupled to) headend element 40. In one particular example, suitable hardware and/or software can be used in order to suitably provision these elements in the mesh network. In other examples, these elements of headend element 40 can be provided as separate servers (or individual network nodes) coupled to headend element 40. In one general sense, any of the elements associated with headend element 40 (or coupled to the system over the mesh network or the backhaul 22) can be provisioned in any suitable computational manner.

In one particular instance, headend element 40, mesh configuration data element 48, GPS map 44, and/or GIS element 46 are network elements configured to exchange data in a network environment such that the packet management functionality discussed herein is accomplished. As used herein in this Specification, the term 'network element' is meant to encompass various types of servers, routers, switches, gateways, bridges, loadbalancers, firewalls, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for packet management functionalities, as outlined herein.

In regards to GIS element 46, such a component can include a set of tools that captures, stores, analyzes, manages, and/or presents data that can be linked to locations. In general terms, GIS is the merging of cartography, statistical analysis, and/or database technology. GIS element 46 can be configured to create and manipulate spatial areas that may be purpose or application-oriented for which a specific GIS would be developed. Therefore, in a general sense, GIS element 46 includes any information system that integrates, stores, edits, analyzes, shares, and/or displays geographic information for informing decision-making. Furthermore, GIS applications offer tools that allow users (including other applications, services, etc.) to create interactive queries (user-created searches), analyze spatial information, edit data, maps, and present the results of these operations. Additionally, it should be noted that the functions of GIS element 46 and GPS map 44 can be consolidated, shared, or modified based on particular system needs.

Figure 3:
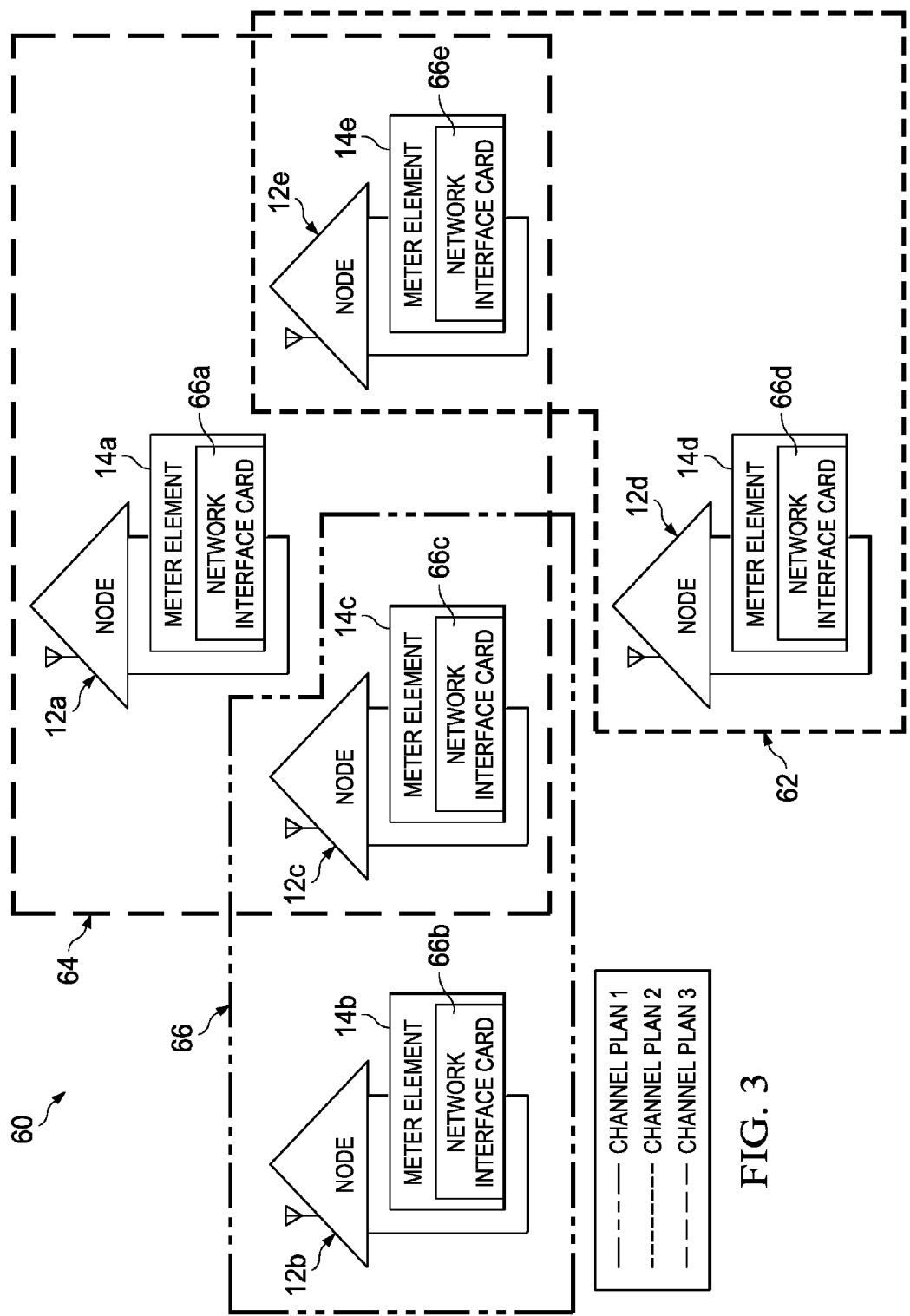
FIG. 3 is a simplified block diagram of an example node configuration associated with a mesh network in accordance with one embodiment of the present disclosure.

Turning to FIG. 3, FIG. 3 is a simplified block diagram illustrating some of the relationships that may exist between nodes 12a-e. In this particular depiction, different channel plans have been illustrated between nodes 12a-e. For example, a first channel plan is associated with nodes 12b-c; a second channel plan is associated with nodes 12a, 12c, and 12e; and a third channel plan is associated with nodes 12d-e. In a specific configuration of FIG. 3, each node 12a-e includes a respective network interface card (NIC) 66a-e.

In this particular example, node 12a, 12d, and 12e may become hidden to node 12b when node 12b communicates with node 12c. Additionally, node 12b and node 12d may become hidden from node 12a when node 12a communicates to either node 12c or node 12e. Similarly, node 12b may become hidden from node 12e when node 12e communicates with node 12c. In accordance with the teachings of the present disclosure, headend element 40 can use geographic information to send configuration data that minimizes collisions in a mesh network. Please note that hidden nodes are hidden if they collide with each other, which can happen if two nodes transmit on the same frequency band at the same time. By moving the various nodes in FIG. 3 to different groups (assumingly to different frequencies), nodes that may otherwise be hidden (i.e., collide) can be properly managed.

For example, the channel plans (or hop sequence) can be defined to prevent (or lessen) hidden node problems (e.g., nodes that are hidden are assigned different channels such that they do not affect each other). In one sense, the coverage overlap of the nodes is minimized for the mesh network. Additionally, the hidden nodes are intelligently estimated using either the GIS data, the GPS map information, or any suitable combination of these elements. Similarly, the choice of channel, power, and grouping is estimated by the location and channel characteristics that can be gleaned from the GPS/GIS information.

Figure 4:
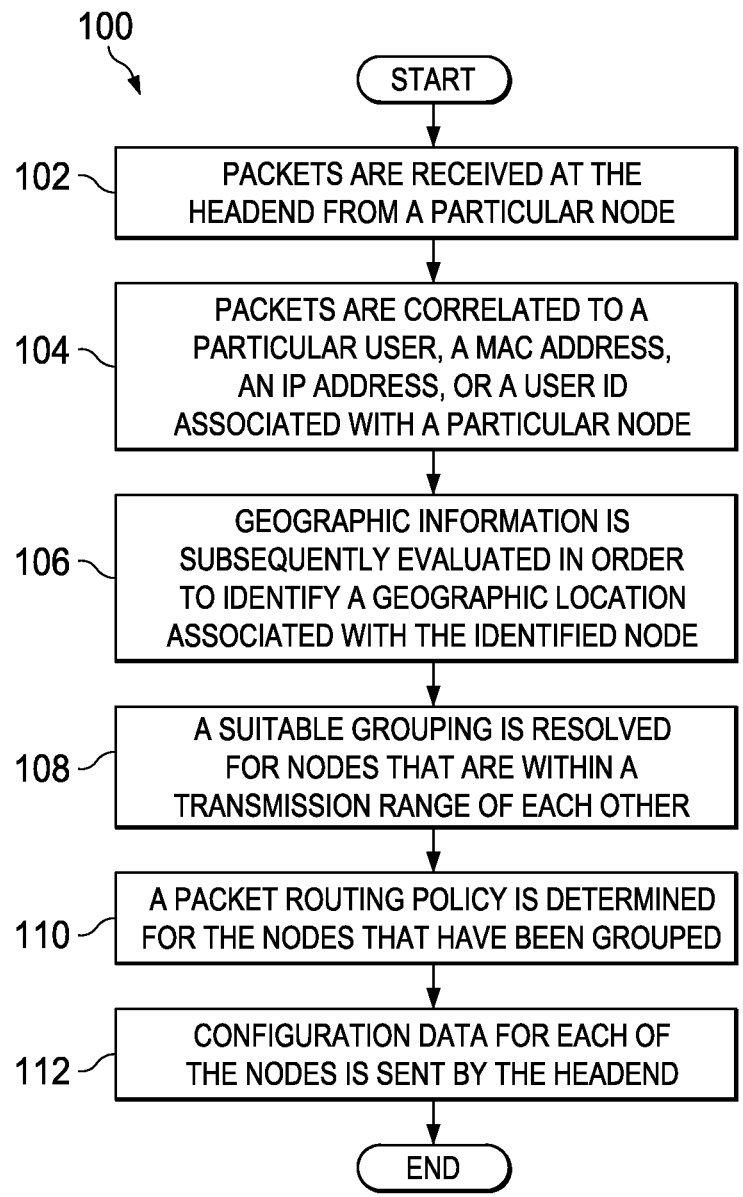
FIG. 4 is a simplified flowchart illustrating an example operational flow involving the communication system for providing configuration data in a mesh network in accordance with one embodiment of the present disclosure.

FIG. 4 is a simplified flowchart 100 illustrating an example operational flow involving communication system 10. The flow may begin at 102, where packets can be received at headend element 40 from a particular node 12a-e. At 104, any suitable identifier can be used to correlate (e.g., link, associate, etc.) the packets to a particular user (e.g., packet information may be used to identify a MAC address, an IP address, a user ID, a particular node, a particular residence, a particular geographic location, a particular individual/family/group, or any other suitable identifier). Additionally, it should be noted that this correlation can be accommodated by accessing any suitable memory element (e.g., a cash, a table, etc.) that may be provisioned within headend element 40 (e.g., provided in mesh configuration element 48, which may include a user information repository, database, etc. (not shown)).

At 106, geographic information is subsequently evaluated in order to identify a geographic location associated with the identified node. The geographic information may be retrieved from GPS map 44, GIS element 46, or any other appropriate database, repository, or memory element. At 108, a suitable grouping is resolved for nodes that are proximate to each other. For example, a certain distance threshold may be set in order to intelligently group nodes that are close in proximity. At 110, a packet routing policy is determined for the nodes that have been grouped. This policy can include determining frequency utilization, channel allocation, hopping schema, etc. in order to optimize performance. Subsequently, at 112, the configuration data for each of the nodes is sent. This configuration data encompasses global intelligence about minimizing packet collisions that would otherwise be caused by the presence of hidden nodes. Hence, communication system 10 is more intelligent in its global assessment and awareness of network node configurations, which allows headend element 40 to appropriately provision suitable configuration data in the context of geographic data.

Note that in certain example implementations, the packet management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in the FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in the FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, each meter element 14a-e, gateway 20, and/or headend element 40 may include software in order to achieve the packet management functions outlined herein. These activities can be facilitated by mesh configuration data element 48, GPS map 44, and/or geographic information system (GIS) element 46, which can be provided as software, or/and as hardware within a respective device. Both headend element 40, meter elements 14a-e, and/or gateway 20 can include memory elements for storing information to be used in achieving the intelligent packet management activities, as outlined herein. Additionally, headend element 40, meter elements 14a-e, and/or gateway 20 may include a processor that can execute software or an algorithm to perform the packet management activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., queue, buffer, database, lookup table, cache, etc.) should be construed as being encompassed within the broad term 'memory element.' Similarly, any of the potential processing elements, modules, and machines described in this Specification should be construed as being encompassed within the broad term 'processor.' Each of meter elements 14a-e, gateway 20, and/or and headend element 40 can also include suitable interfaces for receiving, transmitting, and/or otherwise communicating data or information in a network environment.

Note that with the example provided above, as well as numerous other examples provided herein, interaction may be described in terms of two, three, or four elements. Similarly, packet management functions that were described as being executed by a single element (such as a single meter element) may be performed by multiple elements (e.g., meter elements operating in conjunction with a computer system at a given node 12a-e and gateway 20). However, this has been done for purposes of clarity and example only. In certain cases, it may be easier to describe one or more of the functionalities of a given set of flows by only referencing a limited number of elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Please note that gateway 20 can be part of the mesh network, but it represents a special member of the mesh, as it also has an uplink (wired or wireless) WAN link.

It is also important to note that the operations in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Moreover, although the present disclosure has been described in detail with reference to particular arrangements and configurations, these example configurations and arrangements may be changed significantly without departing from the scope of the present disclosure. For example, although the present disclosure has been described with reference to particular exchanges involving energy components of a smart grid, an electric grid, etc., communication system 10 may be applicable to other types of sensory and control systems such as water, gas, etc., and arrangements such as any type of electricity network or, more generally, a power environment in which packet propagation occurs over mesh networks. For example, communication system 10 can be applicable to other power environments, such as those encountered in charging stations, large-scale energy storage, power line communications, the smart grid, the SuperSmart Grid, the Super grid, the Unified Smart Grid (USA), a Vehicle-to-grid (V2G) architecture, etc. Moreover, communication system 10 can be deployed in traditional mesh networks that do not involve smart grid, or electric grid applications. In such instances, the packet management operations discussed herein can readily be adopted by a given mesh network to improve performance.

In addition, the described WLAN environment can be replaced by any IP network, home area network (HAN), field area network (FAN), local area network (LAN), metropolitan area network (MAN), Intranet, Extranet, wide area network (WAN), virtual private network (VPN), or any other appropriate architecture or system that facilitates communications in a network environment. Additionally, communication system 10 is applicable to mesh over wired connections (e.g., PLC and the backhaul can be done over radio, WiMAX, long-term evolution (LTE), cellular, G3, G4, etc.).

Communication system 10 can be implemented using any standard or proprietary protocols, and the data can be transferred over a dedicated wire network, via wireless, radio, or using the power lines themselves via power line communications (PLC), broadband over power line (BPL) communication links, etc. Moreover, the present disclosure is equally applicable to various green technologies in which packet propagation may be present. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving packets from a group of nodes configured to operate in a mesh network;
   referencing geographic information associated with the group of nodes;
   evaluating a subset of the group of nodes within a particular geographic area;
   for each of the nodes comprising the subset of the group of nodes:
      determining a global positioning system (GPS) location and a location of the node relative to the subset of the group of nodes;
      developing a packet routing policy for the node based on the relative location thereof, wherein the packet routing policy comprises configuration data including at least one of an intelligent channel assignment, frequency hopping schema, and power level for transmission; and
      communicating the configuration data to the node.

2. The method of claim 1, further comprising:
   determining an identifier associated with the packets; and
   evaluating the identifier in order to correlate the identifier to at least one node of the group of nodes.

3. The method of claim 1, wherein developing a packet routing policy further includes:
   determining hidden nodes within the subset of the group of nodes based on the relative location of the subset of the group of nodes;
   assigning a selected one of a transmission power parameter and an orthogonal frequency hopping sequence parameter to the subset of the group of nodes having the hidden nodes; and
   communicating the parameters to the subset of the nodes.

4. The method of claim 1, wherein evaluating the subset of the group of nodes within the particular geographic area further includes:
   obtaining a respective network address for each one of the group of nodes;
   determining a street address associated with a particular packet sent from a meter element; and
   mapping the street address to a selected portion of the geographical GPS information.

5. The method of claim 1, wherein the configuration data includes channel allocation for the subset of the group of nodes.

6. The method of claim 1, wherein the configuration data includes a hopping schema for packets that traverse the mesh network and the subset of the group of nodes.

7. The method of claim 1, wherein the geographic information is retrieved from a global positioning system (GPS) map or from a geographic information system (GIS) element.

8. One or more non-transitory tangible media that includes code for execution and when executed by a processor operable to perform operations comprising:
- receiving packets from a group of nodes configured to operate in a mesh network;
- referencing geographic information associated with the group of nodes;
- evaluating a subset of the group of nodes within a particular geographic area;
- for each of the nodes comprising the subset of the group of nodes:
  - determining a global positioning system (GPS) location and a location of the node relative to the subset of the group of nodes;
  - developing a packet routing policy for the node based on the relative location thereof, wherein the packet routing policy comprises configuration data including at least one of an intelligent channel assignment, frequency hopping schema, and power level for transmission; and
  - communicating the configuration data to the node.

9. The media of claim 8, wherein the operations further comprise:
- determining an identifier associated with the packets; and
- evaluating the identifier in order to correlate the identifier to at least one node of the group of nodes.

10. The media of claim 8, wherein developing a packet routing policy further includes:
- determining hidden nodes within the subset of the group of nodes based on the relative location of the subset of the group of nodes;
- assigning a selected one of a transmission power parameter and an orthogonal frequency hopping sequence parameter to the subset of the group of nodes having the hidden nodes; and
- communicating the parameters to the subset of the nodes.

11. The media of claim 8, wherein evaluating the subset of the group of nodes within the particular geographic area further includes:
- obtaining a respective network address for each one of the group of nodes;
- determining a street address associated with a particular packet sent from a meter element; and
- mapping the street address to a selected portion of the geographical GPS information.

12. The media of claim 8, wherein the configuration data includes channel allocation for the subset of the group of nodes.

13. The media of claim 8, wherein the geographic information is retrieved from a global positioning system (GPS) map or from a geographic information system (GIS) element.

14. An apparatus, comprising:
- a memory element configured to store electronic code;
- a processor operable to execute instructions associated with the electronic code; and
- a mesh configuration data element configured to interface with the processor such that the apparatus is configured for:
  - receiving packets from a group of nodes configured to operate in a mesh network;
  - referencing geographic information associated with the group of nodes;
  - evaluating a subset of the group of nodes within a particular geographic area;
  - for each of the nodes comprising the subset of the group of nodes:
    - determining a global positioning system (GPS) location and a location of the node relative to the subset of the group of nodes;
    - developing a packet routing policy for the node based on the relative location thereof, wherein the packet routing policy comprises configuration data including at least one of an intelligent channel assignment, frequency hopping schema, and power level for transmission; and
    - communicating the configuration data to the node.

15. The apparatus of claim 14, wherein the apparatus is further configured for:
- determining an identifier associated with the packets; and
- evaluating the identifier in order to correlate the identifier to at least one node of the group of nodes.

16. The apparatus of claim 14, wherein developing a packet routing policy includes:
- determining hidden nodes within the subset of the group of nodes based on the relative location of the subset of the group of nodes;
- assigning a selected one of a transmission power parameter and an orthogonal frequency hopping sequence parameter to the subset of the group of nodes having the hidden nodes; and
- communicating the parameters to the subset of the nodes.

17. The apparatus of claim 14, wherein evaluating the subset of the group of nodes within the particular geographic area further includes:
- obtaining a respective network address for each one of the group of nodes;
- determining a street address associated with a particular packet sent from a meter element; and
- mapping the street address to a selected portion of the geographical GPS information.

18. The apparatus of claim 14, wherein the configuration data includes channel allocation for the subset of the group of nodes.

19. The apparatus of claim 14, wherein the configuration data includes a hopping schema for packets that traverse the mesh network and the subset of the group of nodes.

20. The apparatus of claim 14, further comprising:
- a geographic information system (GIS) element; and
- a global positioning system (GPS) map, wherein the geographic information is retrieved from the GPS map or from the GIS element.

* * * * *